United States Patent
Fu et al.

(10) Patent No.: US 9,729,792 B2
(45) Date of Patent: Aug. 8, 2017

(54) DYNAMIC IMAGE SELECTION

(71) Applicant: Amazon Technologies, Inc., Reno, NV (US)

(72) Inventors: Kah Kuen Fu, Sunnyvale, CA (US); Kenneth Mark Karakotsios, San Jose, CA (US); Volodymyr V. Ivanchenko, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 150 days.

(21) Appl. No.: 14/585,033

(22) Filed: Dec. 29, 2014

(65) Prior Publication Data

US 2015/0116518 A1 Apr. 30, 2015

Related U.S. Application Data

(63) Continuation of application No. 13/557,610, filed on Jul. 25, 2012, now Pat. No. 8,922,662.

(51) Int. Cl.
*H04N 5/225* (2006.01)
*H04N 5/232* (2006.01)

(52) U.S. Cl.
CPC ..... *H04N 5/23264* (2013.01); *H04N 5/23212* (2013.01); *H04N 5/23232* (2013.01)

(58) Field of Classification Search
None
See application file for complete search history.

(56) References Cited

U.S. PATENT DOCUMENTS

| 6,125,198 A * | 9/2000 | Onda | G01C 11/06 348/E13.014 |
| 8,068,668 B2 | 11/2011 | Hong | |
| 2006/0056733 A1 | 3/2006 | Minakuti et al. | |
| 2007/0036469 A1 * | 2/2007 | Kim | G06K 9/325 382/305 |
| 2007/0208629 A1 * | 9/2007 | Jung | G06Q 30/0603 705/26.43 |
| 2008/0175508 A1 | 7/2008 | Bando et al. | |
| 2009/0102963 A1 | 4/2009 | Yeo et al. | |

(Continued)

OTHER PUBLICATIONS

Notice of Allowance dated Sep. 5, 2014 for U.S. Appl. No. 13/557,610, filed Jul. 25, 2012, 9 pages.

(Continued)

*Primary Examiner* — Twyler Haskins
*Assistant Examiner* — Dwight C Tejano
(74) *Attorney, Agent, or Firm* — Polsinelli LLP

(57) ABSTRACT

Image capture can be improved by capturing a sequence of images and analyzing the images to select the image with the least blur and/or an acceptable amount of blur. Gradients can be calculated for at least a portion of the images, and gradient histograms generated. Two or more component curves can be fit to each histogram, such as by using a Gaussian mixture model, and the curves can be compared to determine an amount of variation between the curves. The image with the smallest differences between component curves, or with differences less than a specified blur threshold, can be selected as a sufficiently sharp image and provided for viewing, processing, or another intended purpose of the image to be captured.

18 Claims, 7 Drawing Sheets

(56) References Cited

U.S. PATENT DOCUMENTS

| | | | |
|---|---|---|---|
| 2009/0319388 A1* | 12/2009 | Yuan | G06Q 30/0601 705/26.1 |
| 2011/0043642 A1* | 2/2011 | Yu | G06F 17/30265 348/207.1 |
| 2011/0109764 A1* | 5/2011 | Hong | G02B 7/36 348/222.1 |
| 2012/0314121 A1 | 12/2012 | Tay | |

OTHER PUBLICATIONS

Chen, Ming-Jun, et al., "No-Reference Image Blur Assessment Using Multiscale Gradient," Month Unknown, 2011, 5 pages.
Liu, Renting, et al., "Image Partial Blur Detection and Classification," Month Unknown, 2008, 8 pages.

* cited by examiner

DYNAMIC IMAGE SELECTION

CROSS REFERENCE TO RELATED APPLICATIONS

This application is a Continuation of allowed U.S. patent application Ser. No. 13/557,610, entitled "Dynamic Image Selection," filed with the U.S. Patent and Trademark Office on Jul. 25, 2012, which is incorporated herein by reference for all purposes.

BACKGROUND

Users are increasingly utilizing electronic devices to obtain various types of information. For example, a user wanting to obtain information about a book can capture an image of the cover of the book and upload that image to a book identification service for analysis. The cover image will be matched against a set of two-dimensional images including views of objects from a particular orientation. It often will be the case, however, that the captured image will include an amount of blur due to the camera being moved during image capture. A blurred image can cause problems with processes such as image matching and object identification, which can rely on features such as sharp corners and edges that may not be present in a blurred image. Even a small amount of blur due to the inherent motion of a user's hand can prevent an image from being processed successfully. Using conventional approaches, a user capturing an image would either have to look at the image before causing the image to be analyzed, or would have to capture another image if the processing of an earlier-captured image did not yield adequate results.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to capturing and processing images using an electronic device. In particular, various embodiments enable a device to capture a sequence of images when a user attempts to capture an image to be processed. At least a portion of the sequence of images can be analyzed to determine which of the images has the least amount of blur, or otherwise provides the sharpest view of the objects represented in the image. Based at least in part upon the analysis, the sharpest image can be selected and provided for processing.

Various other functions and advantages arc described and suggested below as may be provided in accordance with the various embodiments.

Figure 1:
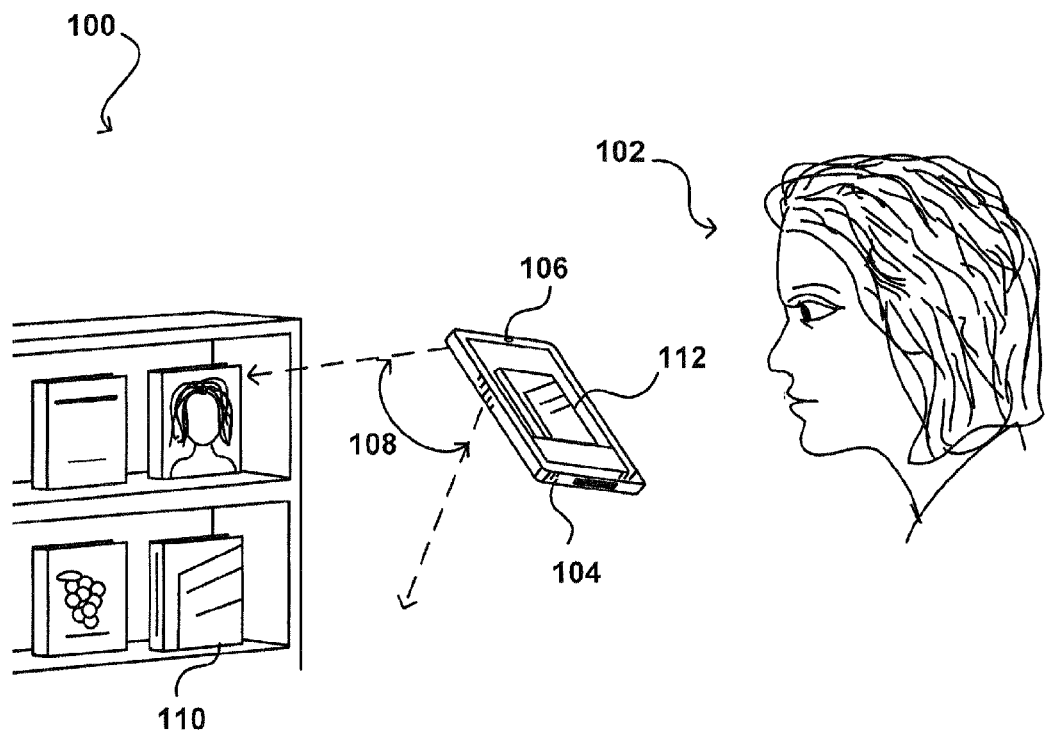
FIG. 1 illustrates an example environment in which aspects of the various embodiments can be that can be utilized.

FIG. 1 illustrates an example environment 100 in which aspects of the various embodiments can be implemented. In this example, a user 102 is in a store that sells books, and is interested in obtaining information about a book 110 of interest. Using an appropriate application executing on a computing device 104, the user is able to obtain an image of the book 110 by positioning the computing device such that the book is within a field of view 108 of at least one camera 106 of the computing device. Although a portable computing device (e.g., an electronic book reader, smart phone, or tablet computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, and portable media players, among others.

In this example, a camera 106 on the device 104 can capture image information including the book 110 of interest, and at least a portion of the image can be displayed on a display screen 112 of the computing device. At least a portion of the image information can be analyzed and, upon a match being located, identifying information can be displayed back to the user via the display screen 112 of the computing device 104. The portion of the image to be analyzed can be indicated manually, such as by a user pointing to the book on the screen or drawing a bounding box around the book. In other embodiments, one or more image analysis algorithms can attempt to automatically locate one or more objects in an image. In some embodiments, a user can manually cause image information to be analyzed, while in other embodiments the image information can be analyzed automatically, either on the device or by transferring image data to a remote system or service as discussed later herein.

Figure 2:
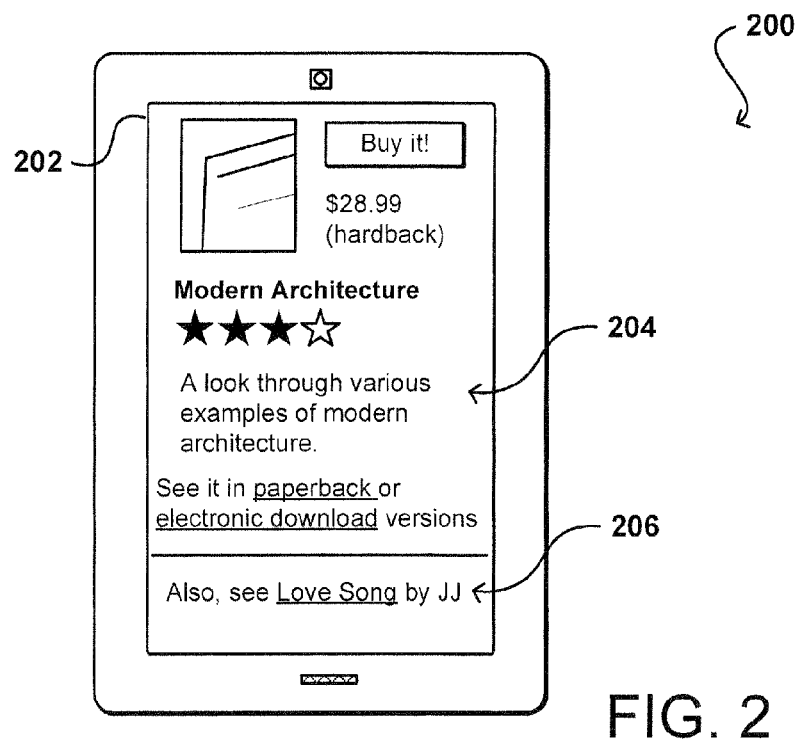
FIG. 2 illustrates example display that can be presented in accordance with various embodiments.

FIG. 2 illustrates an example of a type of information 204 that could be displayed to the user via a display screen 202 of a computing device 200 in accordance with various embodiments. In this example, the image captured by the user has been analyzed and related information 204 is displayed on the screen. The "related" information as discussed elsewhere herein can include any information related to an object, item, product, or other element that is matched (within at least a level of confidence) to the image data using one or more matching or identifying algorithms, or other such approaches. These can include, for example, image recognition algorithms, object identification algorithms, facial recognition algorithms, or any other such approaches or techniques. The displayed information in this example includes the title of the located book, an image of the book (as captured by the user or otherwise obtained), pricing and description information, and review information. Also as shown are options to purchase the book, as well as options for various other versions or forms of that content, such as a paperback book or digital download. The type of information displayed (or otherwise conveyed) can depend at least in part upon the type of content located or matched. For example, a located book might include author and title information, as well as formats in which the book is available. For facial recognition, the information might include name, title, and contact information. Various other types of information can be displayed as well within the scope of the various embodiments.

Figure 3:
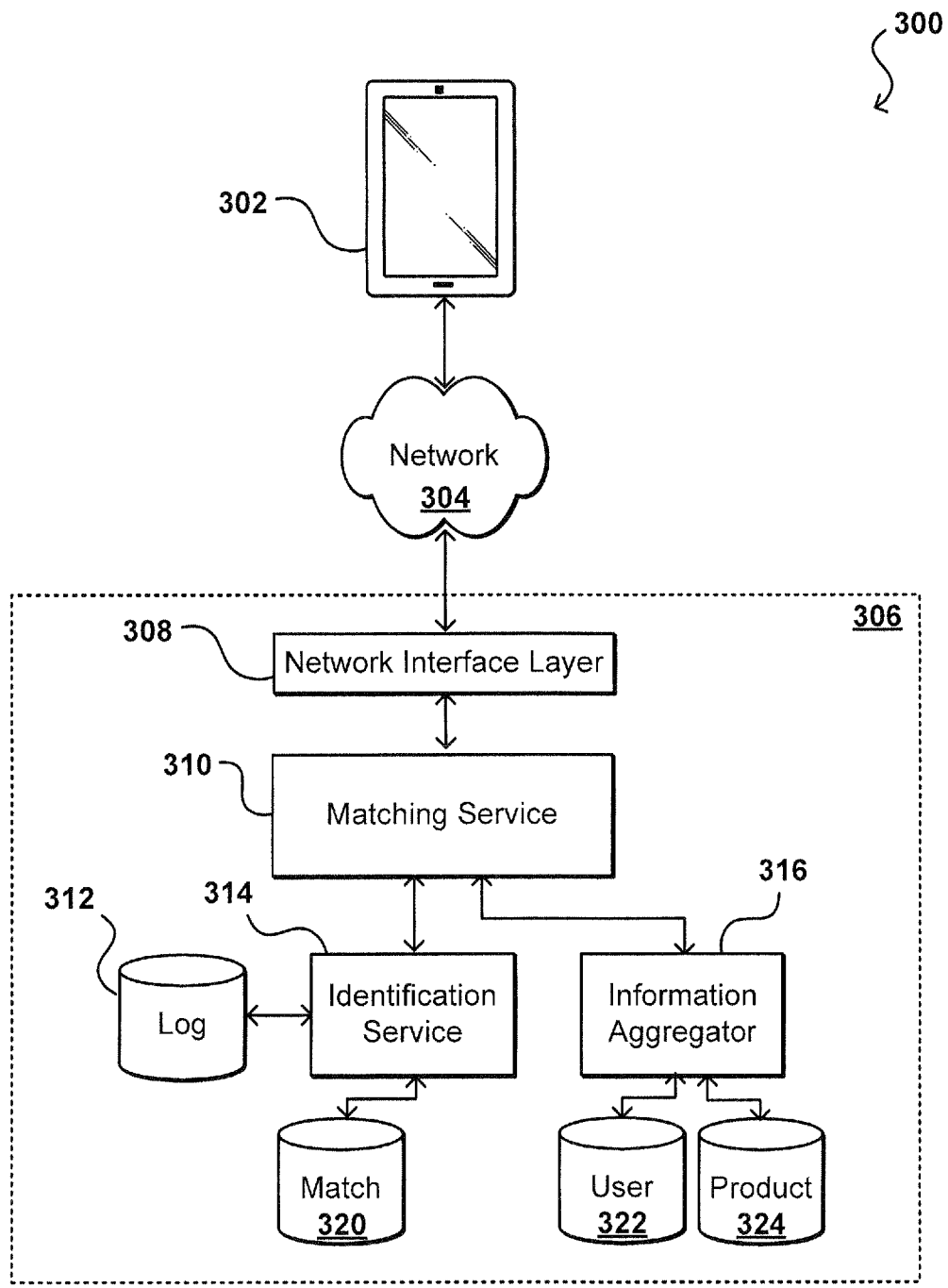
FIG. 3 illustrates example system for identifying items and providing information about those items that can be utilized in accordance with various embodiments.

As discussed, information such as that illustrated in FIG. 2 can be located by streaming (or otherwise transferring) an image, video, and/or other electronic data to a system or service operable to find one or more potential matches for that data and provide related information for those potential matches. FIG. 3 illustrates an example environment 300 in which such information can be located and transferred in accordance with various embodiments. In this example, a user is able to capture one or more types of information using at least one computing device 302. For example, a user can cause a device to capture audio and/or video information around the device, and can send at least a portion of that audio and/or video information across at least one appropriate network 304 to attempt to obtain information for one or more objects, persons, or occurrences within a field of view of the device. The network 304 can be any appropriate network, such as may include the Internet, a local area network (LAN), a cellular network, and the like. The request can be sent to an appropriate content provider 306, as may provide one or more services, systems, or applications for processing such requests. The information can be sent by streaming or otherwise transmitting data as soon as it is obtained and/or ready for transmission, or can be sent in batches or through periodic communications. In some embodiments, the computing device can invoke a service when a sufficient amount of image data is obtained in order to obtain a set of results. In other embodiments, image data can be streamed or otherwise transmitted as quickly as possible in order to provide near real-time results to a user of the computing device.

In this example, the request is received to a network interface layer 308 of the content provider 306. The network interface layer can include any appropriate components known or used to receive requests from across a network, such as may include one or more application programming interfaces (APIs) or other such interfaces for receiving such requests. The network interface layer 308 might be owned and operated by the provider, or leveraged by the provider as part of a shared resource or "cloud" offering. The network interface layer can receive and analyze the request, and cause at least a portion of the information in the request to be directed to an appropriate system or service, such as a matching service 310 as illustrated in FIG. 3. A matching service in this example includes components operable to receive image data about an object, analyze the image data, and return information relating to people, products, places, or things that are determined to match objects in that image data.

The matching service 310 in this example can cause information to be sent to at least one identification service 314, device, system, or module that is operable to analyze the image data and attempt to locate one or more matches for objects reflected in the image data. In at least some embodiments, an identification service 314 will process the received data, such as to extract points of interest or unique features in a captured image, for example, then compare the processed data against data stored in a matching data store 320 or other such location. In other embodiments, the unique feature points, image histograms, or other such information about an image can be generated on the device and uploaded to the matching service, such that the identification service can use the processed image information to perform the match without a separate image analysis and feature extraction process. Certain embodiments can support both options, among others. The data in an image matching data store 320 might be indexed and/or processed to facilitate with matching, as is known for such purposes. For example, the data store might include a set of histograms or feature vectors instead of a copy of the images to be used for matching, which can increase the speed and lower the processing requirements of the matching. Approaches for generating image information to use for image matching are well known in the art and as such will not be discussed herein in detail.

The matching service 310 can receive information from each contacted identification service 314 as to whether one or more matches could be found with at least a threshold level of confidence, for example, and can receive any appropriate information for a located potential match. The information from each identification service can be analyzed and/or processed by one or more applications of the matching service, such as to determine data useful in obtaining information for each of the potential matches to provide to the user. For example, a matching service might receive bar codes, product identifiers, or any other types of data from the identification service(s), and might process that data to be provided to a service such as an information aggregator service 316 that is capable of locating descriptions or other content related to the located potential matches.

In at least some embodiments, an information aggregator might be associated with an entity that provides an electronic marketplace, or otherwise provides items or content for consumption (e.g., purchase, rent, lease, or download) by various customers. Although products and electronic commerce are presented in this and other examples presented, it should be understood that these are merely examples and that approaches presented in the present disclosure can relate to any appropriate types of objects or information as discussed and suggested elsewhere herein. In such an instance, the information aggregator service 316 can utilize the aggregated data from the matching service 310 to attempt to locate products, in a product data store 324 or other such location, which are offered through the marketplace and that match, or are otherwise related to, the potential match information. For example, if the identification service identifies a book in the captured image or video data, the information aggregator can attempt to determine whether there are any versions of that book (physical or electronic) offered through the marketplace, or at least for which information is available through the marketplace. In at least some embodiments, the information aggregator can utilize one or more suggestion algorithms or other such approaches to attempt to determine related elements that might be of interest based on the determined matches, such as a movie or audio tape version of a book. In some embodiments, the information aggregator can return various types of data (or metadata) to the environmental information service, as may include title information, availability, reviews, and the like. For facial recognition applications, a data aggregator might instead be used that provides data from one or more social networking sites, professional data services, or other such entities. In other embodiments, the information aggregator might instead return information such as a product identifier, uniform resource locator (URL), or other such digital entity enabling a browser or other interface on the client device 302 to obtain information for one or more products, etc. The information aggregator can also utilize the aggregated data to obtain various other types of data as well. Information for located matches also can be stored in a user data store 322 of other such location, which can be used to assist in determining future potential matches or suggestions that might be of interest to the user. Various other types of information can be returned as well within the scope of the various embodiments.

The matching service 310 can bundle at least a portion of the information for the potential matches to send to the client as part of one or more messages or responses to the original request. In some embodiments, the information from the identification services might arrive at different times, as different types of information might take longer to analyze, etc. In these cases, the matching service might send multiple messages to the client device as the information becomes available. The potential matches located by the various identification services can be written to a log data store 312 or other such location in order to assist with future matches or suggestions, as well as to help rate a performance of a given identification service. As should be understood, each service can include one or more computing components, such as at least one server, as well as other components known for providing services, as may include one or more APIs, data storage, and other appropriate hardware and software components.

It should be understood that, although the identification services are shown to be part of the provider environment 306 in FIG. 3, that one or more of these identification services might be operated by third parties that offer these services to the provider. For example, an electronic retailer might offer an application that can be installed on a computing device for identifying music or movies for purchase. When a user transfers a video clip, for example, the provider could forward this information to a third party who has software that specializes in identifying objects from video clips. The provider could then match the results from the third party with items from the retailer's electronic catalog in order to return the intended results to the user as one or more digital entities, or references to something that exists in the digital world. In some embodiments, the third party identification service can be configured to return a digital entity for each match, which might be the same or a different digital entity than will be provided by the matching service to the client device 302.

As mentioned, however, images or video frames provided by users often will be somewhat blurry, which can affect the ability of an image processing algorithm to recognize and/or identify objects in those images or frames. For example, conventional algorithms such as computer vision or other image processing algorithms make use of features such as sharp edges and corners. A certain amount of blur in an image can reduce the sharpness of these features, which can cause the algorithms to not be able to identify objects in the image, or to incorrectly identify those objects, among other such undesired outcomes. Due to the intolerance to blur, images captured by users with mobile devices can be particularly problematic, as a user's hand may often be unsteady which can result in small motions of the device and, accordingly, at least some blur in many images. While a user can capture another image and have the additional image processed as well, the additional step drains battery power which is already limited in many portable electronic devices. Further, it can take additional processing power and further drain the battery when attempting to process images with very few sharp features.

Accordingly, approaches in accordance with various embodiments can cause a series of images to be captured and analyzed in an attempt to select an image with a least amount of blur. A blur detection algorithm can quickly analyze one or more of the images to determine whether or not the image is sharp enough for processing, or can analyze each image in the sequence and select the sharpest image for processing, among other such options. The selected image then can be provided to the appropriate system, service, device, application, or other such entity for processing, such as to recognize or identify one or more objects in the image.

Although various algorithms can be used to select a sufficiently sharp image, in at least some embodiments it is desired that the algorithm be lightweight enough to run on embedded devices. It can be important for at least some mobile and other devices that the blur detection algorithm not add much overhead to any existing image processing and/or computer vision algorithms used to process captured images. It is also desirable in at least some embodiments that the algorithm is relatively fast, such that little additional latency is introduced on top of the amount of time that the image processing algorithms need to identify objects in the images. It further is desirable in at least some embodiments that the algorithm be adaptive, as the algorithm needs to reject unacceptably blurry images but it is possible that an entire sequence of images might be blurry. In at least some instances it can be desirable for the algorithm to preserve one or more of the relatively sharper images from a stream of blurry images, and remove only the relatively blurry images.

Approaches in accordance with various embodiments utilize an image blur detection algorithm that is based at least in part upon a gradient histogram span and is designed to satisfy at least the above criteria. Such an algorithm can distinguish blurry images from sharp images in image sequences with high accuracy. It should be understood that other algorithms can be used as well in other embodiments, as may include color saturation and power spectrum algorithms, but these algorithms might not work as well in situations where there is low light or limited processing power, among other such factors.

Figure 4A:
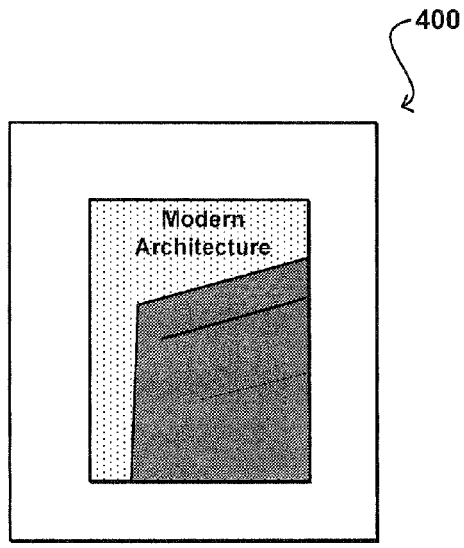
FIGS. 4(a), 4(b), 4(c) and 4(d) illustrate example images that can be captured, and gradient distributions for those images, that can be analyzed in accordance with various embodiments.
Figure 4B:
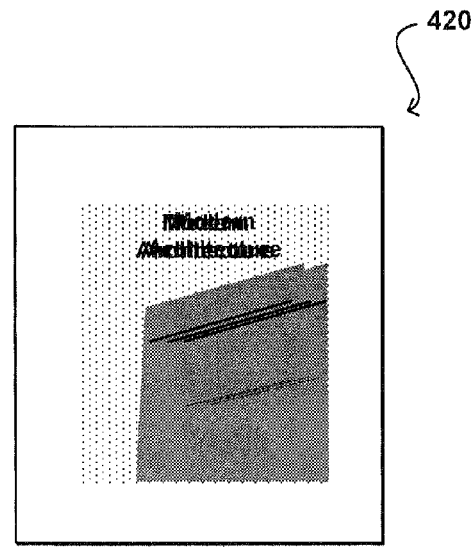

As discussed, an approach in accordance with various embodiments can cause multiple images to be taken in sequence when a user attempts to capture an image to be analyzed. In some embodiments, this functionality might be built into an application that the user accesses in order to provide images for analysis. In other embodiments, such functionality might be embedded into a computing device or camera, or otherwise available. For example, a camera might be configured to automatically take several images over a number of milliseconds that the user might not even notice, with potentially a single "click" noise being generated that corresponds to the capturing of the image sequence. The device might then automatically provide the clearest image as the captured image. FIGS. 4(a) and 4(b) illustrate two images 400, 420 that might be captured in sequence when a user attempts to capture an image of an object (e.g., a book) to be identified. As illustrated, the image 400 in FIG. 4(a) is relatively sharp, having defined edges and sharp features. On the other hand, the image 420 of FIG. 4(b) is relatively blurry, having few, if any, sharp edges or features. It can be desirable for an algorithm to analyze the sequence and determine that the sharp image 400 should be provided for processing, with the blurry image 420 being rejected.

Figure 4C:
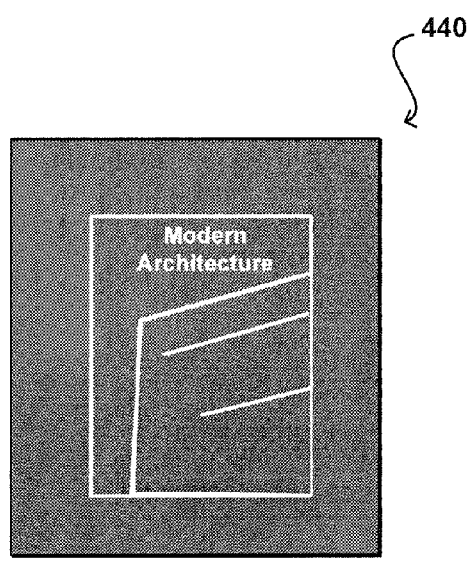
Figure 4D:
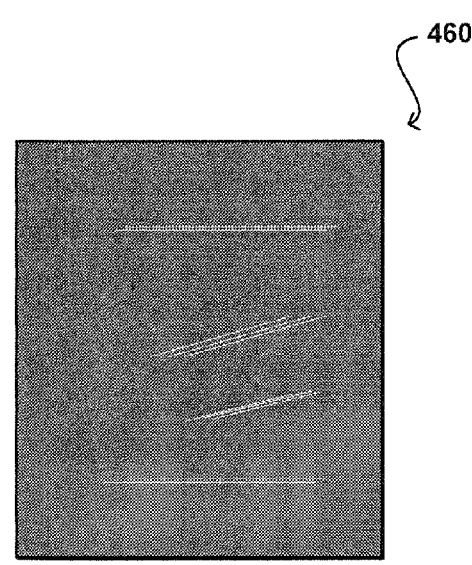

As discussed, in some embodiments an algorithm can analyze the images one at a time until an image is located that has at most an acceptable amount of blur, as may be less than a threshold amount of blur or might meet some sharpness criteria, among other such options. In other embodiments, the algorithm can analyze each of the sequence of images and attempt to estimate the sharpness confidence of each image, in order to select the clearest image in the stream or sequence. For at least the latter case, the algorithm can compute the gradients of each image, as each image will have a distribution of image gradients corresponding to edges, features, or other transitions in the images. Approaches to determining image gradients are well known in the art and, as such, will not be discussed herein in detail. FIG. 4(c) illustrates a view 440 of the gradients of the sharper image, which are relatively pronounced around the edges of the book, as well as for distinct features on the cover of the book. FIG. 4(d) illustrates a view 460 of the gradients of the blurry image. As can be seen, there are very few gradients that are visible, as there are few sharp transitions or features in the blurry image 420 of FIG. 4(b).

Figure 5A:
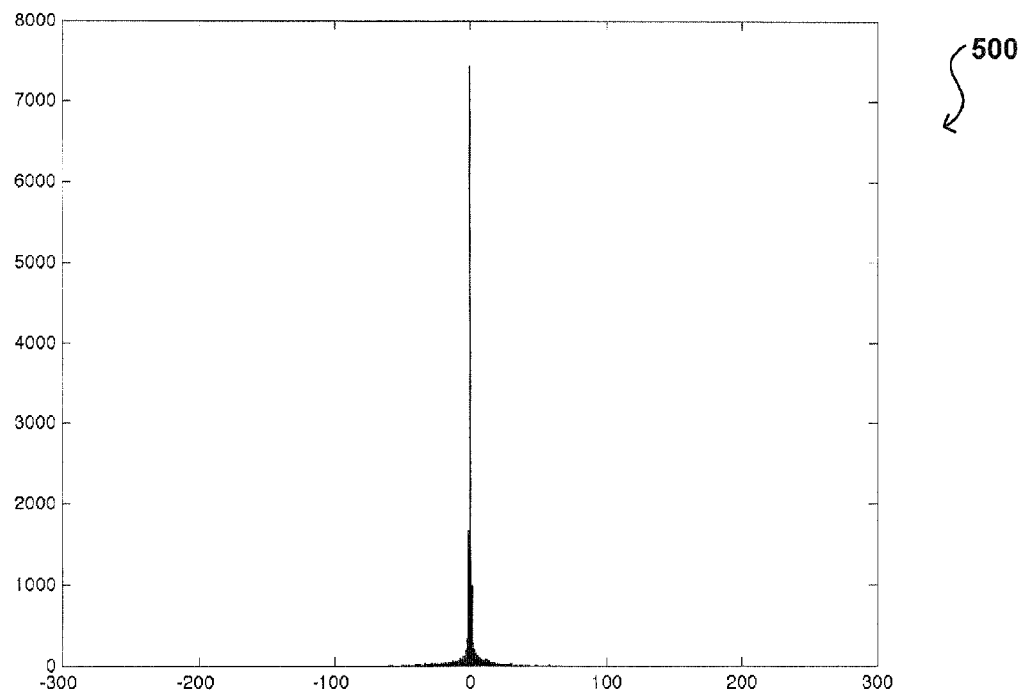
FIGS. 5(a) and 5(b) illustrate example gradient histogram spans that can be generated in accordance with various embodiments.
Figure 5B:
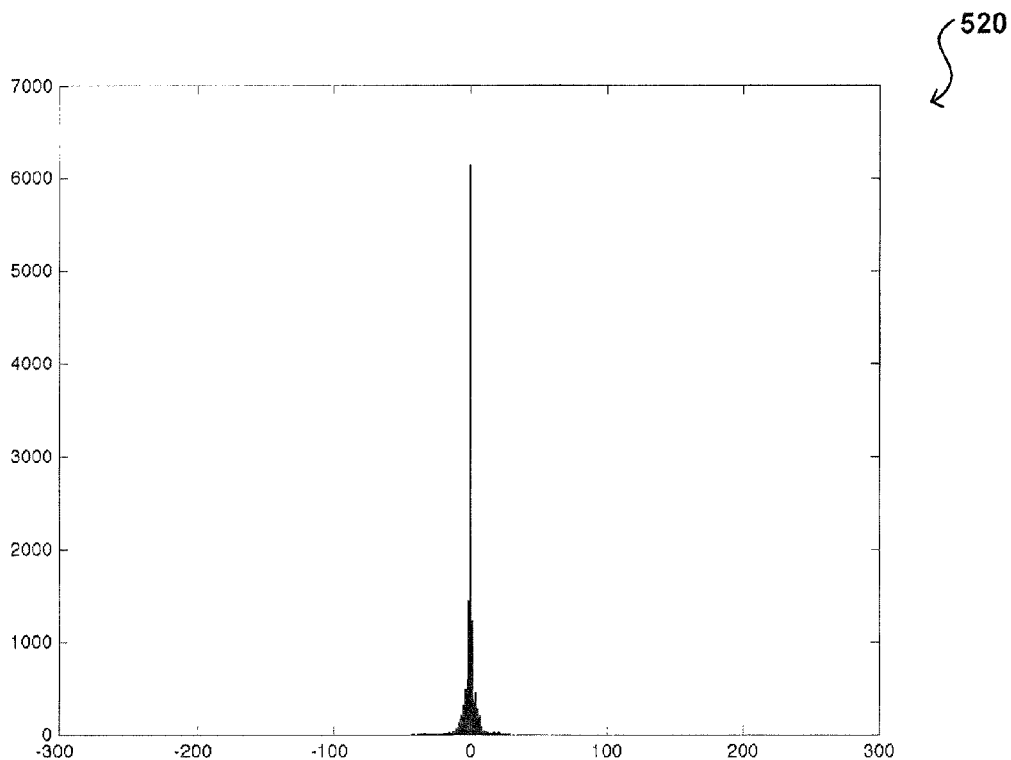

After the gradients of the images are calculated, a gradient histogram or "histogram span" can be generated for each of the images. FIG. 5(a) illustrates an example of a plotted histogram 500, or distribution of the pixel values, for the sharper image of FIG. 4(a), and FIG. 5(b) illustrates an example of a plotted histogram 520 for the relatively blurry image of FIG. 4(b). As can be seen, the plot 500 for the sharper image has a longer tail and a thinner distribution than that for the blurry image.

Approaches in accordance with various embodiments then can attempt to fit two or more curves to each of the gradient histograms 500, 520. In at least one embodiment a two-component Gaussian mixture model is used to fit two distribution curves to the data, although additional components and curves can be used as well in other embodiments. One of the distribution curves represents a sharp component of the image, and the other component represents a blurry component of the image. In some cases, such as where the background is static but a foreground object is blurry in an image, one of the curves can describe the static part (e.g., high frequency portions) and one of the curves can describe the moving part (e.g., low frequency portions). In at least some embodiments a sigma value can be calculated for each curve, and then the sigma values can be compared to determine a level of sharpness of each image. If the sigma values are similar, meaning that the curves for the sharp and blurry portions are similar, then the image is relatively sharp. If the curves, and thus the sigma values, differ significantly, there can be a large blur component in the image, and that image might not be selected for processing. In at least some embodiments the Gaussian information can also be used to determine a location of the sharp features in the selected image. In other embodiments, an area of each of the curves for a histogram can be calculated, and the differences between those areas compared to differences for other histograms, with the image having the histogram with the least difference in area between curves being selected for processing. Other approaches can be used as well, such as comparing the areas of the curves, the means of the curves, etc.

Figure 6:
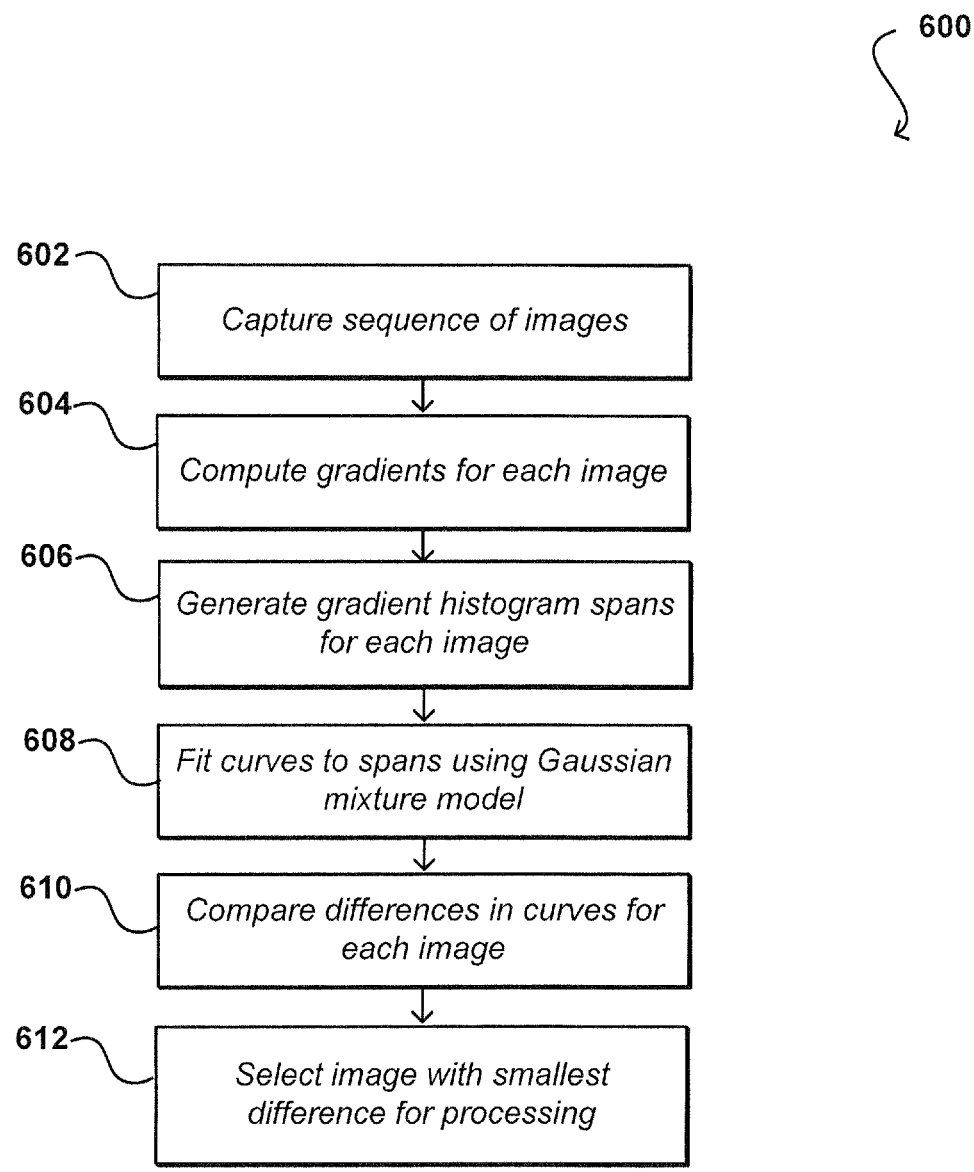
FIG. 6 illustrates an example process for determining information about an object imaged by a user that can be utilized in accordance with various embodiments.

FIG. 6 illustrates an example process 600 for selecting an image for processing that can be utilized in accordance with various embodiments. It should be understood that there can be additional, fewer, or alternative steps performed in similar or alternative orders, or in parallel, within the scope of the various embodiments unless otherwise stated. In this example, a sequence of images is captured 602. As discussed, in some cases the sequence can be captured automatically in response to a user providing an input causing a camera of a computing device to capture an image, while in other situations the user might select to capture a sequence of images, such as where the object to be imaged might be moving relative to the user. Once at least a portion of the sequence is captured, gradients can be computed 604 for at least some of the images, and gradient histogram spans generated 606 using those gradients. At least two curves can be fit 608 to the spans using a Gaussian mixture model, or other such model capable of separating two components of the histogram spans. Differences in the curves can be compared 610, and the image with the smallest differences between the curves can be selected 612 as the sharpest image for processing. As discussed, in other embodiments the images in the sequence might be analyzed one at a time until an image is located that has a sufficiently small difference between the curves, or until no more images are available to analyze, among other such options.

The following represents a description of the application of an example Gaussian mixture model in accordance with at least one embodiment. As mentioned, for sharp images the gradient information will be relatively rich, while for blurry images there can be little gradient information. Therefore, the plot of a histogram for a blurry image can have a heavy tail, and a sharp image can have no apparent tail. By assumption both the blurry and sharp components are in a normal distribution, and a two-component Gaussian Mixture Model can be used to separate these two curves. As a result, after removing the noise, the difference of the variance of the two curves would be large if there is a heavy tail, and the difference of the variance of the two curves would be small if there is no apparent tail. The variance of the two components can be estimates in one embodiment as follows.

A sample of n independent observations from a mixture of two multivariate normal distributions of dimension d can be given by:

$$x=(x_1,x_2,\ldots x_n)$$

and the latent variables that determine the component from which the observations originates can be given by:

$$z=(z_1,z_2,\ldots z_n)$$

It then follows that $$X_i|(Z_i=2)\sim N_d(\mu_2,\Sigma_2)$$

and $$X_i|(Z_i=2)\sim N_d(\mu_2,\Sigma_2)$$

where $$P(Z_i=1)=\tau_1 \text{ and } P(Z_i=2)=\tau_2=1-\tau_1$$

The aim is to estimate the unknown parameters representing the mixing value between the Gaussians, as well as the means and covariances of each:

$$\theta=(\tau,\mu_1,\mu_2,\Sigma_1,\Sigma_2)$$

wherein the likelihood function is:

$$L(\theta;x,z) = P(x,z|\theta) = \prod_{i=1}^{n}\sum_{j=1}^{2} \mathbb{I}(z_i=j)\tau_j f(x_i;\mu_j,\Sigma_j)$$

where L is an indicator function and P is the probability density function of a multivariate normal. This may be rewritten in exponential family form:

$$L(\theta; x, z) = \exp\left\{\sum_{i=1}^{n}\sum_{j=1}^{2} \mathbb{I}(z_i = j)\left[\log\tau_j - \frac{1}{2}\log|\Sigma_j| - \frac{1}{2}(x_i - \mu_j)^T\Sigma_j^{-1}(x_i - \mu_j) - \frac{d}{2}\log(2\pi)\right]\right\}$$

Given the current estimate of the parameters $\theta^{(t)}$, the conditional distribution of the $z_i$ is determined by Bayes theorem to be the proportional height of the normal density weighted by $\tau$.

$$T_{j,i}^{(t)} := P(Z_i = j \mid X_i = x_i; \theta^{(t)}) = \frac{\tau_j^{(t)} f(x_i; \mu_j^{(t)}, \Sigma_j^{(t)})}{\tau_1^{(t)} f(x_i; \mu_1^{(t)}, \Sigma_1^{(t)}) + \tau_2^{(t)} f(x_i; \mu_2^{(t)}, \Sigma_2^{(t)})}$$

Thus, $$Q(\theta \mid \theta^{(t)}) = E[\log L(\theta; x, Z)]$$
$$= \sum_{i=1}^{n}\sum_{j=1}^{2} T_{j,i}^{(t)} \left[\log\tau_j - \frac{1}{2}\log|\Sigma_j| - \frac{1}{2}(x_i - \mu_j)^T\Sigma_j^{-1}(x_i - \mu_j) - \frac{d}{2}\log(2\pi)\right]$$

The quadratic form of $Q(\theta|\theta^{(t)})$ means that determining the maximizing values of $\theta$ is relatively straightforward. Firstly, it can be noted that $\tau$, $(\mu_1, \Sigma_1)$, and $(\mu_2, \Sigma_2)$ may all be maximized independently of each other since they all appear in separate linear terms. For example, consider $\tau$, which has the constraint $\tau_1 + \tau_2 = 1$:

$$\tau^{(t+1)} = \underset{\tau}{\operatorname{argmax}} Q(\theta \mid \theta^{(t)})$$
$$= \underset{\tau}{\operatorname{argmax}} \left\{\left[\sum_{i=1}^{n} T_{1,i}^{(t)}\right]\log\tau_1 + \left[\sum_{i=1}^{n} T_{2,i}^{(t)}\right]\log\tau_2\right\}$$

This has the same form as the MLE for the binomial distribution, so:

$$\tau_j^{(t+1)} = \frac{\sum_{i=1}^{n} T_{j,i}^{(t)}}{\sum_{i=1}^{n}(T_{1,i}^{(t)} + T_{2,i}^{(t)})} = \frac{1}{n}\sum_{i=1}^{n} T_{j,i}^{(t)}$$

For the next estimates of $(\mu_1, \Sigma_1)$:

$$(\mu_1^{(t+1)}, \Sigma_1^{(t+1)}) = \underset{\mu_1, \Sigma_1}{\operatorname{argmax}} Q(\theta \mid \theta^{(t)})$$
$$= \underset{\mu_1, \Sigma_1}{\operatorname{argmax}} \sum_{i=1}^{n} T_{1,i}^{(t)} \left\{-\frac{1}{2}\log|\Sigma_1| - \frac{1}{2}(x_i - \mu_1)^T \Sigma_1^{-1}(x_i - \mu_1)\right\}$$

This has the same form as a weighted MLE for a normal distribution, so:

$$\mu_1^{(t+1)} = \frac{\sum_{i=1}^{n} T_{1,i}^{(t)} x_i}{\sum_{i=1}^{n} T_{1,i}^{(t)}} \text{ and } \Sigma_1^{(t+1)} = \frac{\sum_{i=1}^{n} T_{1,i}^{(t)} (x_i - \mu_1^{(t+1)})(x_i - \mu_1^{(t+1)})^T}{\sum_{i=1}^{n} T_{1,i}^{(t)}}$$

and by symmetry:

$$\mu_2^{(t+1)} = \frac{\sum_{i=1}^{n} T_{2,i}^{(t)} x_i}{\sum_{i=1}^{n} T_{2,i}^{(t)}} \text{ and } \Sigma_2^{(t+1)} = \frac{\sum_{i=1}^{n} T_{2,i}^{(t)} (x_i - \mu_2^{(t+1)})(x_i - \mu_2^{(t+1)})^T}{\sum_{i=1}^{n} T_{2,i}^{(t)}}$$

The two components can vary not only across blurry and sharp images, but also across different image sequences. For instance, some objects in images contain more edges than others. In addition, even if the whole image sequence is blurry, it still can be desirable to preserve the relatively sharper images. Therefore, the current computed variances could be compared with those of the previous frames. An online algorithm can be used to maintain a window of frames variances. A sudden drop in sharpness confidence can indicate the image is relatively blurry compared with the previous frames. The window in at least one embodiment is set to one second for the current frame.

The ability to select a sharp image can have potential benefits for a number of different applications. For example, images captured using a camera application can be improved. When users press down the capture button on a mobile device, the device might shake involuntary a bit. That small amount of shaking may not be easily detected by motion sensors such as an electronic gyroscope. This capturing problem can be mitigated by capturing several consecutive images, then using an approach discussed herein to select the sharpest image. Alternatively, the camera might only stop capturing images once a sufficiently sharp image has been captured, as determined by at least one algorithm as discussed or suggested herein.

In another example, an application that captures images of objects near a computing device and attempts to provide information about those objects can benefit as well. A challenging problem in object recognition on an image sequence is to select the most informative image(s) for recognition. Algorithms discussed herein can not only select the sharpest images, but also choose the most informative (with most edges and corners) images out of the sequence.

Such an approach can help to provide accurate results while minimizing the amount of processing needed. Such an approach also can help to quickly identify bad images or video frames, which can help to increase accuracy and efficiency. A similar benefit can arise for facial recognition or other such applications.

Such approaches also provide significant benefits when portions of the processing of an image are offloaded to another device, such as by sending information to be processed "in the cloud" by a resource across a network. The transferring and processing of data remotely typically comes with an amount of latency, and waiting to find out that an image is too blurry to provide accurate results can be frustrating for a user. For cameras that might capture images on the order of tens of frames per second or more, each frame can be processed on the order of milliseconds such that the camera can continue to capture images until an adequately sharp image is captured, in many cases without the user noticing any delay.

Figure 7:
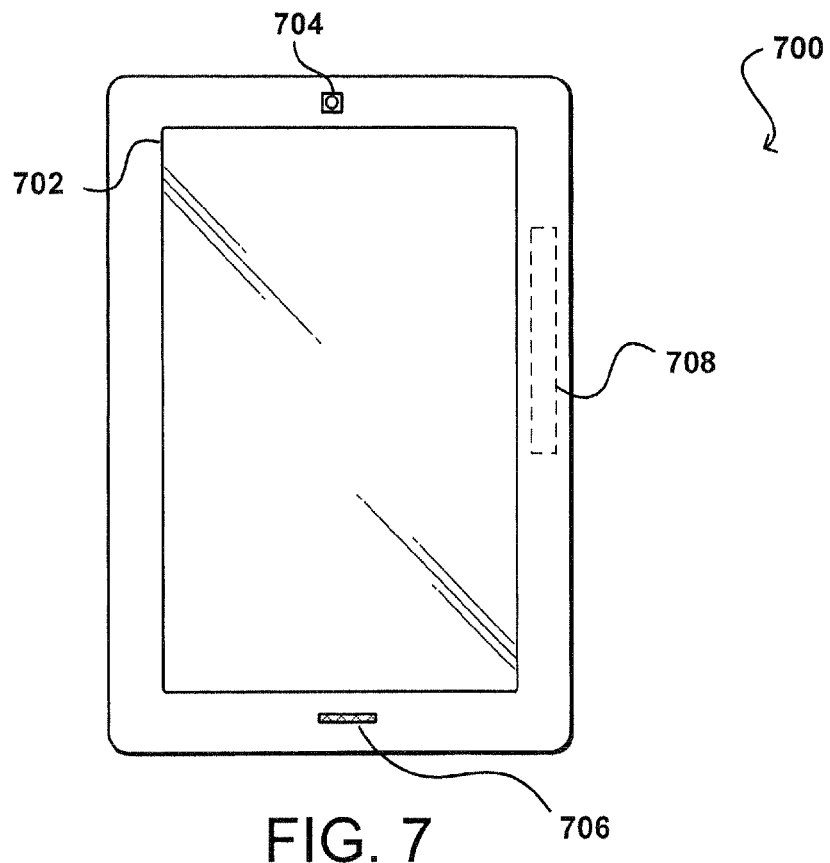
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaining consoles, television set top boxes, and portable media players. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
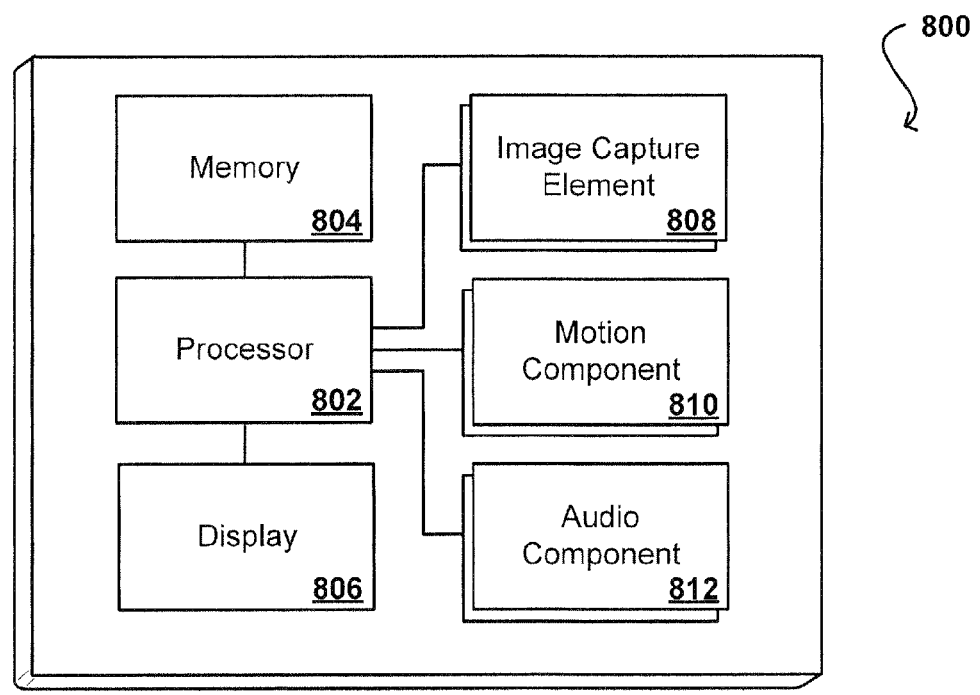
FIG. 8 illustrates example components of a client device such as that illustrated in FIG. 17.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
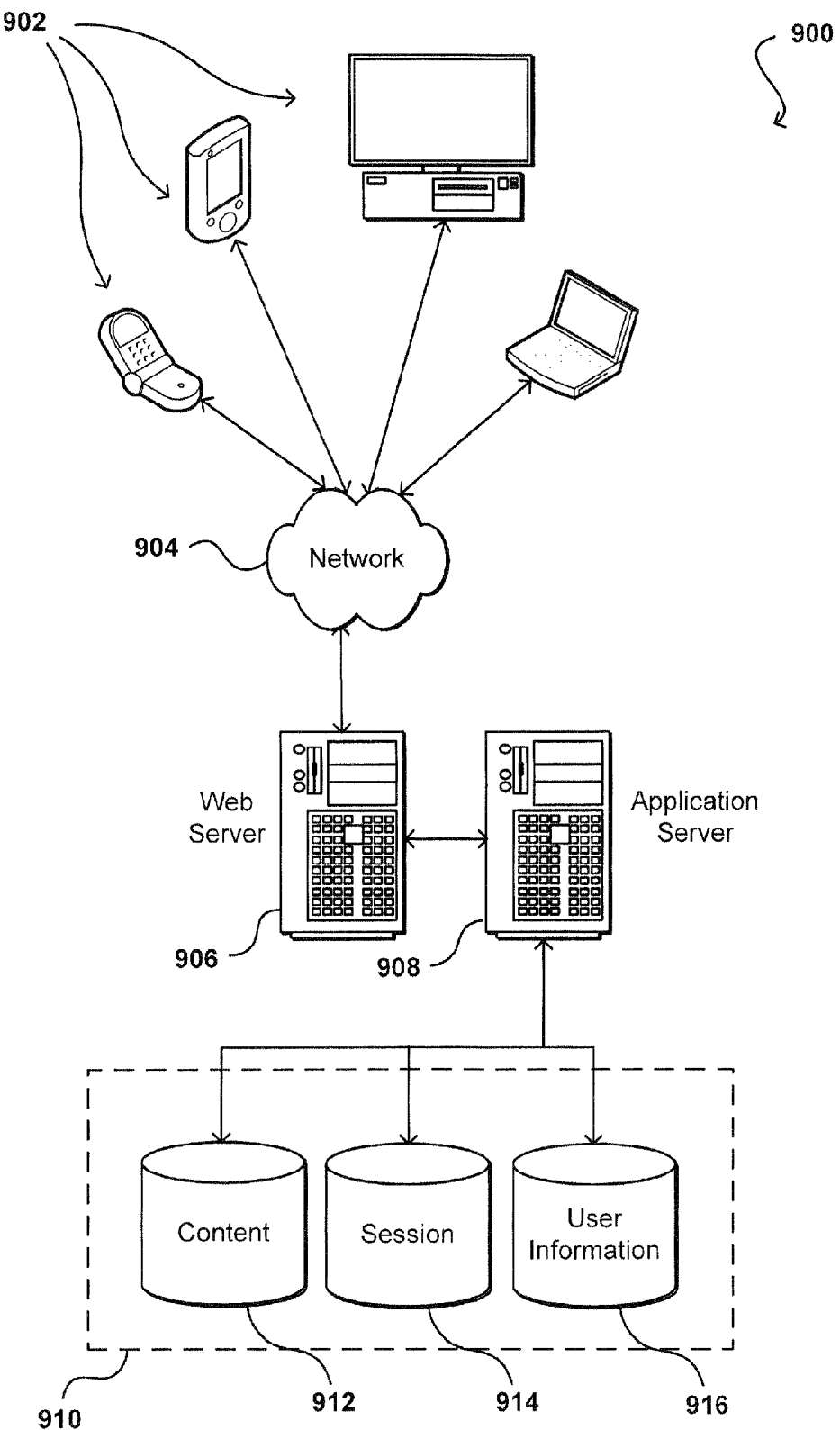
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to he regarded in an illustrative rather than a restrictive sense. It will, however, be evident that various modifications and changes may be made thereunto without departing from the broader spirit and scope of the invention as set forth in the claims.

What is claimed is:
1. A computer-implemented method, comprising:
capturing a sequence of images using a camera of a computing device;
generating first gradient histogram data for a first image included in the sequence of images;
determining a first sigma value corresponding to the first image by analyzing the first gradient histogram data, the first sigma value representing a first variance of gradient values in the first gradient histogram data;
generating second gradient histogram data for a second image included in the sequence of images;
determining a second sigma value corresponding to the second image by analyzing the second gradient histogram data, the second sigma value representing a second variance of gradient values in the second gradient histogram data;
stopping the capturing of the sequence of images when the first sigma value is greater than the second sigma value; and selecting the first image from the sequence of images when the first sigma value is greater than the second sigma value.

2. The computer-implemented method of claim 1, further comprising:
   determining a plurality of sigma values corresponding to a plurality of images in the sequence of images being captured;
   stopping the capturing of images when an image in the sequence of images being captured is determined to have a sigma value greater than a threshold sigma value; and
   selecting the image determined to have the sigma value greater than the threshold sigma value.

3. The computer-implemented method of claim 1, wherein the first sigma value corresponds to pixel value changes in image features.

4. The computer-implemented method of claim 1, wherein the second sigma value corresponds to an amount of blur present in the second image.

5. The computer-implemented method of claim 1, further comprising:
   capturing additional images when none of the captured images have a sigma value greater than a threshold sigma value.

6. The computer-implemented method of claim 1, wherein the generating, the determining, and the selecting are automatically performed in a camera module of the computing device.

7. The computer-implemented method of claim 1, wherein the capturing a sequence of images further comprises:
   receiving a selection of a portion of the first image in the sequence of images; and
   providing the portion of the first image for generating the first gradient histogram data of the first image.

8. The computer-implemented method of claim 1, wherein the sequence of images comprises frames of video captured by the camera.

9. The computer-implemented method of claim 1, further comprising:
   sending the first image to a remote service for processing, the processing including identifying at least one object represented in the first image.

10. The computer-implemented method of claim 9, further comprising:
    receiving related information associated with the at least one object, wherein the at least one object corresponds to a product available for purchase; and
    displaying at least a portion of the related information on a display of the computing device.

11. A computing device, comprising:
    at least one processor;
    a camera; and
    a memory device including instructions that, when executed by the at least one processor, cause the computing device to:
    capture a sequence of images using the camera;
    generate first gradient histogram data for a first image included in the sequence of images;
    determine a first sigma value corresponding to the first image by analyzing the first gradient histogram data, the first sigma value representing a first variance of gradient values in the first gradient histogram data;
    generate second gradient histogram data for a second image included in the sequence of images;
    determine a second sigma value corresponding to the second image by analyzing the second gradient histogram data, the second sigma value representing a second variance of gradient values in the second gradient histogram data;
    stop the capture of images when the first sigma value is greater than the second sigma value; and
    select the first image from the sequence of images when the first sigma value is greater than the second sigma value.

12. The computing device of claim 11, wherein the instructions when executed further cause the computing device to:
    send the first image to a remote service for processing, the processing including identifying at least one object represented in the first image.

13. The computing device of claim 12, wherein the instructions when executed further cause the computing device to:
    receive related information associated with the at least one object, wherein the at least one object corresponds to a product available for purchase; and
    display at least a portion of the related information on a display of the computing device.

14. The computing device of claim 11, wherein the first sigma value and the second sigma value represent amounts of blur.

15. A non-transitory computer-readable storage medium including instructions that, when executed by at least one processor of a computing device, cause the computing device to:
    capture a sequence of images;
    generate first gradient histogram data for a first image included in the sequence of images;
    determine a first sigma value corresponding to the first image by analyzing the first gradient histogram data, the first sigma value representing a first variance of gradient values in the first gradient histogram data;
    generate second gradient histogram data for a second image included in the sequence of images;
    determine a second sigma value corresponding to the second image by analyzing the second gradient histogram data, the second sigma value representing a second variance of gradient values in the second gradient histogram data;
    stop the capture of the sequence of images when the first sigma value is greater than the second sigma value; and
    select the first image from the sequence of images when the first sigma value is greater than the second sigma value.

16. The non-transitory computer-readable storage medium of claim 15, wherein the instructions when executed further cause the computing device to:
    determine a plurality of sigma values corresponding to a plurality of images in the sequence of images being captured; and
    stop the capturing of images when an image in the sequence of images being captured is determined to have a sigma value greater than a threshold sigma value.

17. The non-transitory computer-readable storage medium of claim 15, wherein the instructions when executed further cause the computing device to:
    send the first image to a remote service for processing, the processing including identifying at least one object represented in the first image.

18. The non-transitory computer-readable storage medium of claim 17, wherein the instructions when executed further cause the computing device to:
   receive related information associated with the object, wherein the object corresponds to a product available for purchase; and
   display at least a portion of the related information on a display of the computing device.

\* \* \* \* \*